United States Patent
Mao et al.

(10) Patent No.: US 9,201,286 B2
(45) Date of Patent: Dec. 1, 2015

(54) METHOD AND APPARATUS FOR WAVELENGTH SELECTIVE SWITCH

(71) Applicant: Huawei Technologies Co., Ltd., Shenzhen (CN)

(72) Inventors: Chongchang Mao, Wuhan (CN); Minchun Li, Wuhan (CN); Bo Chen, Shenzhen (CN); Yang Fang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/641,176

(22) Filed: Mar. 6, 2015

(65) Prior Publication Data
US 2015/0185583 A1 Jul. 2, 2015

Related U.S. Application Data

(62) Division of application No. 13/753,202, filed on Jan. 29, 2013, now Pat. No. 9,008,470.

(60) Provisional application No. 61/592,573, filed on Jan. 30, 2012.

(51) Int. Cl.
G02F 1/1335 (2006.01)
G02F 1/31 (2006.01)
(Continued)

(52) U.S. Cl.
CPC .............. *G02F 1/31* (2013.01); *G02B 6/29383* (2013.01); *G02B 6/356* (2013.01); *G02B 6/3594* (2013.01);
(Continued)

(58) Field of Classification Search
CPC ................................................. G02F 1/133528
See application file for complete search history.

(56) References Cited

U.S. PATENT DOCUMENTS

| | | | |
|---|---|---|---|
| 6,249,364 | B1 | 6/2001 | Martin et al. |
| 6,687,431 | B2 | 2/2004 | Chen et al. |

(Continued)

FOREIGN PATENT DOCUMENTS

| | | | |
|---|---|---|---|
| CN | 101681064 A | 3/2010 | |
| JP | 2005331757 A | 12/2005 | |

(Continued)

OTHER PUBLICATIONS

Notice of Reason(s) for Rejection with English Translation received in Japanese Patent Application No. 2014547708, Jun. 9, 2015, 9 pages.

*Primary Examiner* — Timothy L Rude
(74) *Attorney, Agent, or Firm* — Slater & Matsil, L.L.P.

(57) ABSTRACT

Apparatus and method embodiments are provided for implementing a wavelength selective switch (WSS). The embodiments use combinations of switchable polarization grating (SPG) and LC cells and combinations of polymer polarization grating (PPG) and LC cells to achieve 1×N WSS systems. An embodiment optical switch includes a liquid crystal cell and a polymer polarization grating (PPG) cell adjacent to the liquid crystal cell. The PPG includes a glass substrate, a photo-alignment layer overlying the glass substrate and comprising photosensitive polymer that has been physically altered by exposure using two interfering light beams with opposite handedness of circular polarization, and a polymerized liquid crystal layer overlying the photo-alignment layer on an opposite side of the glass substrate, the polymerized liquid crystal layer has been physically altered by illumination using a uniform light beam.

9 Claims, 12 Drawing Sheets

(51) Int. Cl.

| | | |
|---|---|---|
| *G02F 1/01* | (2006.01) | |
| *G02B 27/28* | (2006.01) | |
| *G02F 1/1337* | (2006.01) | |
| *G02F 1/1347* | (2006.01) | |
| *G02F 1/29* | (2006.01) | |
| *H04Q 3/00* | (2006.01) | |
| *G02B 6/35* | (2006.01) | |
| *H04J 14/02* | (2006.01) | |
| *G02B 17/08* | (2006.01) | |
| *G02B 6/293* | (2006.01) | |
| *G02B 26/08* | (2006.01) | |
| *H04Q 11/00* | (2006.01) | |
| *G02B 3/00* | (2006.01) | |
| *G02B 5/12* | (2006.01) | |

(52) U.S. Cl.
CPC .......... *G02B 17/0864* (2013.01); *G02B 27/286* (2013.01); *G02F 1/0136* (2013.01); *G02F 1/13471* (2013.01); *G02F 1/133528* (2013.01); *G02F 1/133788* (2013.01); *G02F 1/292* (2013.01); *H04J 14/0212* (2013.01); *H04Q 3/00* (2013.01); *G02B 3/005* (2013.01); *G02B 5/12* (2013.01); *G02B 26/0808* (2013.01); *G02B 27/285* (2013.01); *G02F 2001/13355* (2013.01); *G02F 2001/133538* (2013.01); *G02F 2001/133541* (2013.01); *G02F 2001/133757* (2013.01); *G02F 2001/311* (2013.01); *G02F 2201/305* (2013.01); *G02F 2203/05* (2013.01); *G02F 2203/07* (2013.01); *H04Q 2011/0015* (2013.01); *H04Q 2213/1301* (2013.01)

(56) References Cited

U.S. PATENT DOCUMENTS

| | | | |
|---|---|---|---|
| 6,707,959 | B2 | 3/2004 | Ducellier et al. |
| 7,196,758 | B2 | 3/2007 | Crawford et al. |
| 7,468,840 | B2 | 12/2008 | Cohen et al. |
| 7,492,986 | B1 | 2/2009 | Kelly |
| 7,499,608 | B1 | 3/2009 | Kelly et al. |
| 7,692,759 | B2 | 4/2010 | Escuti et al. |
| 7,787,720 | B2 | 8/2010 | Frisken et al. |
| 7,909,958 | B2 | 3/2011 | Washburn et al. |
| 8,064,035 | B2 | 11/2011 | Escuti et al. |
| 8,081,875 | B2 | 12/2011 | Keyworth et al. |
| 2005/0100277 | A1 | 5/2005 | Frisken |
| 2011/0085222 | A1 | 4/2011 | Komiya |
| 2011/0242461 | A1 | 10/2011 | Escuti et al. |
| 2011/0293281 | A1 | 12/2011 | Sakurai |
| 2013/0130156 | A1 | 5/2013 | Escuti |
| 2015/0234230 | A1* | 8/2015 | Hirata et al. |

FOREIGN PATENT DOCUMENTS

| | | |
|---|---|---|
| JP | 2007510957 A | 4/2007 |
| JP | 2009042557 A | 2/2009 |
| JP | 2009258438 A | 11/2009 |
| JP | 2010026273 A | 2/2010 |
| JP | 2011248196 A | 12/2011 |
| WO | 2008130559 A2 | 10/2008 |
| WO | 2011014743 A2 | 2/2011 |

* cited by examiner

METHOD AND APPARATUS FOR WAVELENGTH SELECTIVE SWITCH

This application is a divisional application of U.S. patent application Ser. No. 13/753,202, filed on Jan. 29, 2013, which claims the benefit of U.S. Provisional Patent Application No. 61/592,573, filed on Jan. 30, 2012. The afore-mentioned patent applications are hereby incorporated by reference in their entireties.

TECHNICAL FIELD

The present invention relates to optical switches, and, in particular embodiments, to an apparatus and method for a wavelength selective switch.

BACKGROUND

For optical transport network equipment, the use of a reconfigurable optical add/drop multiplexers (ROADMs) can flexibly expand the network capacity and reduce the operation cost. A wavelength selective switch (WSS) is one choice of technology for current RODAMs. For a 1×N WSS, 1 is a common (COM) port and N represents the branch ports. The WSS operates such that when a group of the WDM signals enter from the COM port, the signals are separated by optical wavelengths, and then according to the system requirement, each wavelength is routed to one of the N branch ports. Conversely, the optical signals can be received as input from N branch ports and sent as output from the COM port.

A ROADM provides an automated mechanism to flexibly add capacity as needed without resorting to expensive and service-interrupting "forklift" upgrades. A benefit of the ROADM network is its ability to add dynamic capacity wherever and whenever needed, with the assurance that the underlying network automatically compensates for the added traffic. This eliminates the need for manual tuning or wholesale upgrades. The ROADM can provide add/drop functions in multiple directions with multiple wavelength channels, and thus is suitable to achieve multi-directional interconnections between network rings and to build up mesh networks.

SUMMARY OF THE INVENTION

In accordance with an embodiment, an optical switch includes a liquid crystal cell and a switchable polarization grating (SPG) cell adjacent to the liquid crystal cell. The SPG includes a first glass substrate, a first electrode layer overlying the first glass substrate, a photo-alignment layer overlying the first electrode layer, liquid crystal material overlying the photo-alignment layer, and a second photo-alignment layer overlying the liquid crystal material. The first photo-alignment layer and the second photo-alignment layer comprising photosensitive polymer that have been physically altered by exposure using two interfering light beams with opposite handedness of circular polarization. The SPG further includes a second electrode layer overlying the second photo-alignment layer and a second glass substrate overlying the second electrode layer.

In accordance with another embodiment, an optical switch includes a liquid crystal cell and a polymer polarization grating (PPG) cell adjacent to the liquid crystal cell. The PPG includes a glass substrate, a photo-alignment layer overlying the glass substrate and comprising photosensitive polymer that has been physically altered by exposure using two interfering light beams with opposite handedness of circular polarization, and a polymerized liquid crystal layer overlying the photo-alignment layer on an opposite side of the glass substrate, the polymerized liquid crystal layer has been physically altered by illumination using a uniform light beam.

In accordance with yet another embodiment, a method for operating an optical switch comprising a polarization grating includes polarizing an incident light beam at a circular polarization, directing the polarized light beam to the polarization grating, and diffracting, at the polarization grating, the polarized incident light beam in a determined angle that corresponds to a diffraction order in accordance to the circular polarization of the incident light beam and a hologram pattern direction formed inside the polarization grating, the hologram pattern direction formed using two interfering light beams.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1A:
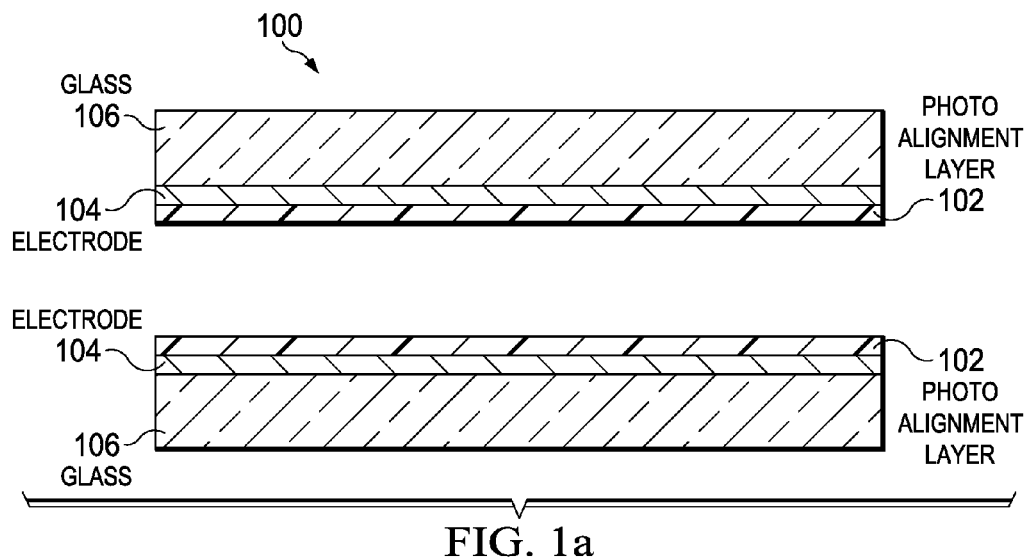
FIGS. 1a and 1b show a fabrication process of a switchable polarization grating (SPG) cell.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Currently used technologies in wavelength selective switch (WSS) products include Micro Electro Mechanical Systems (MEMS), Liquid Crystal on Silicon (LCOS), Liquid Crystal (LC) with a crystal wedge, and Digital Micromirror Devices (DMDs). For these technologies, the optical systems can be similar to each other with differences in the optical switch engines.

In a MEMS system, the wavelengths are diffracted to different channels by a grating and then each wavelength is incident upon a corresponding MEMS reflection mirror. Controlling the voltage on each MEMS mirror can control the mirror's rotation angle to control the light reflection angle. According to the network's requirements, each wavelength can be reflected to a defined angle. The reflected wavelength beams with same angles from multiple channels can be diffracted into one beam after passing through the grating a second time and then coupled into an output port. In order to control the light attenuation and realize hitless function during switching, each MEMS mirror has two rotational directions, one rotation for port switching and another rotation for attenuation and hitless control. A MEMS based WSS has advantages of simple optical system and good performance. However, it has several disadvantages such as high cost on MEMS chip manufacturing due to relatively low yield, high cost on electronics due to the requirement of high voltage driving for MEMS mirrors, difficulty to realize large numbers of ports, and design difficulty to a flexible grid (Flexgrid) function.

LCOS is another technology that is used in WSS systems. The LCOS is composed of a LC layer that is positioned between a glass substrate and a silicon backplane. In a LCOS based WSS, each wavelength light, separated by a grating, is incident on the LCOS panel and covers M×N pixels. Through controlling the voltages on these pixels, a LC phase grating can be formed so that the incident light beam is diffracted to a defined angle. Changing the LC grating pitch can result in different diffraction angles. Therefore, controlling LC phase grating pitch for a wavelength light can route the light beam to the defined output port. A LCOS based WSS has several advantages such as simple optical system, easy to realize high port account, and easy to realize a Flexgrid function. The disadvantages include complicated electronic driving scheme, substantially complex control software, difficulty to realize low cross-talk, and relatively high temperature sensitivity.

Another technology used in WSS is LC with a crystal wedge. WSS design using LC with crystal wedge is described in U.S. Pat. No. 7,499,608 issued Mar. 3, 2009, and entitled "Apparatus And Method for Optical Switching with Liquid Crystals And Birefringent Wedges". The switch engine of such a WSS consists of several stages of LC cell and wedge plate combination, depending on the required number of output ports. In each stage, the LC cell is used to switch light polarization and the wedge plate is used to refract the light to two directions depending on the polarization of the incident light, resulting in a 1×2 optical switch. Therefore, a stack of N stages results in a $1 \times 2^N$ optical switch. The LC cell used is separated to M pixels that are defined by the required optical channels. Controlling the voltage on LC pixels can route the corresponding wavelength light to the defined output ports. Such WSS has advantages of simple driving electronics, high vibration resistance, and high reliability. The disadvantages include high cost due to high material cost, relatively low yield due the complicated device assembly process, and difficulty to realize high port count.

DMD technology is also used in WSS systems. In such system, each wavelength light is incident upon several DMD MEMS mirrors. Controlling rotation angles of these mirrors can direct a light beam to the defined angles. Since the mirrors only have two deflection positions, one DMD chip based WSS only can realize a 1×2 switch. To increase the switching ports of a WSS, more DMD chips are needed, resulting in high cost and high difficulty in optical system design.

As described above, the WSS systems using existing technologies have disadvantages including complex driving electronics with complex software, high cost of materials, low resistance to vibration, and difficulty to expand to a large number of ports. Described herein are embodiment systems and methods for implementing a WSS. The different embodiments use combinations of switchable polarization grating (SPG) and LC cells and combinations of polymer polarization grating (PPG) and LC cells to achieve 1×N WSS systems overcoming at least some of the disadvantages of the systems above.

Figure 1B:
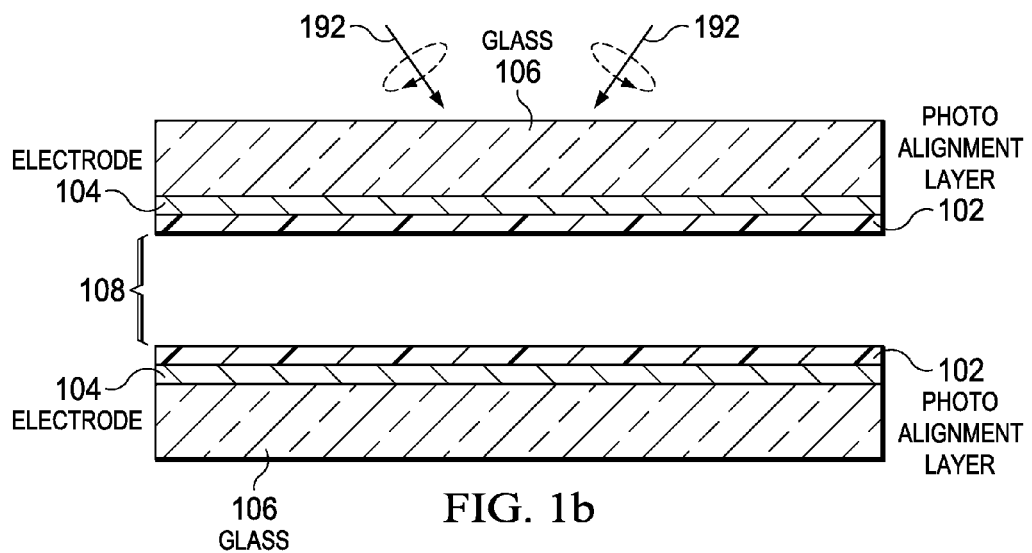

FIGS. 1a and 1b show a fabrication process 100 of a SPG cell. In a conventional LC cell fabrication, the LC alignment layer is fabricated by rubbing or photo-exposing two polymer layers coated on two substrates, which are used to sandwich the LC. The fabrication process 100 of a SPG cell is different with respect to forming the LC alignment layer. In a first step (FIG. 1a) of the fabrication process 100 of the SPG cell, two photosensitive polymer layers 102 are coated on two glass substrates 106, respectively, and then two glass substrates are put together, leaving a gap for LC filling. An electrode (conductor) layer 104 is also added between each photosensitive polymer layer 102 and respective glass substrate 106. Next (FIG. 1b), two interference ultra-violet (UV) light beams 192 (at suitable incident angles) with opposite handedness of circular polarization (with right-handed and left-handed circular polarization respectively) is used to expose (e.g., through the glass substrates 106) the two polymer layers 102 to form a holographic pattern in the polymer layers 102. This interference beam exposure may be applied on each side of the SPG cell to form an alignment layer from the photosensitive polymer layer 102. When LC 108 is filled into the gap and sandwiched between the two glass substrates, the molecules of the LC 108 are aligned with the hologram pattern formed on the photosensitive polymer layers 102 that now serve as LC alignment layers.

Figure 2A:
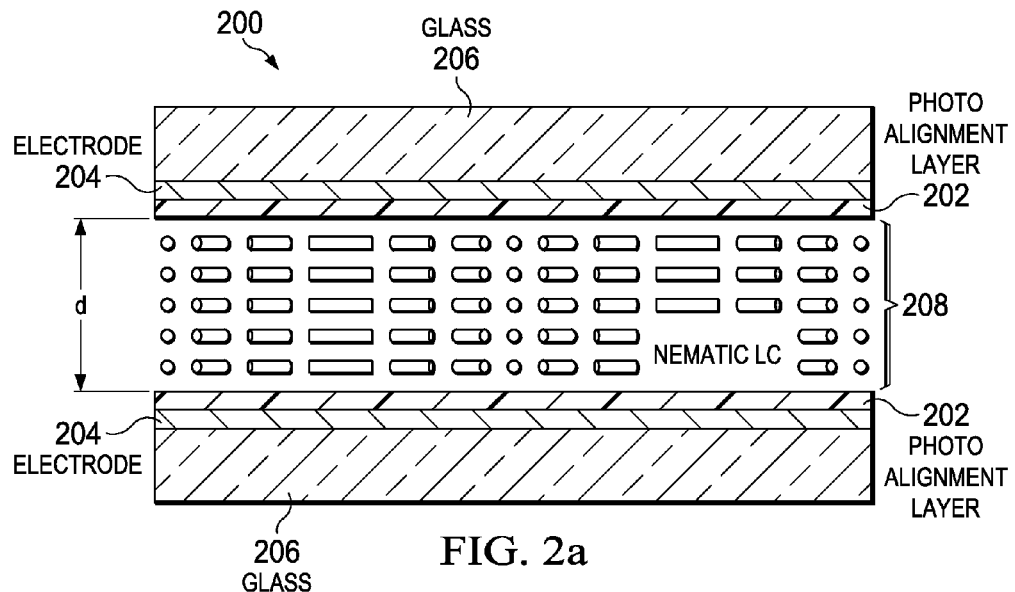
FIGS. 2a and 2b show a SPG cell with and without applied voltage.
Figure 2B:
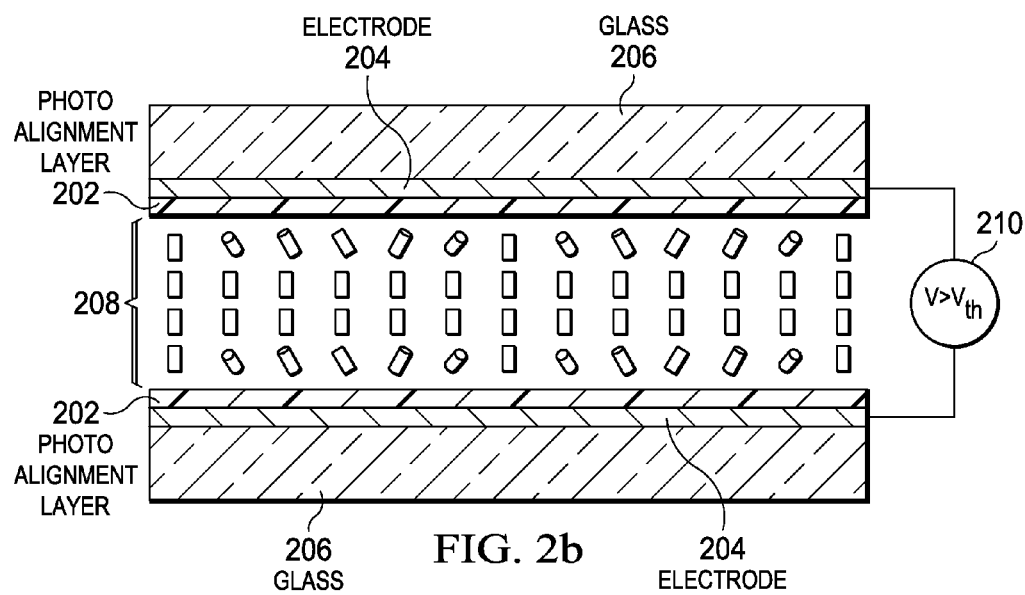

FIGS. 2a and 2b show a SPG cell 200 with and without applied voltage. The SPG cell 200 may be fabricated using the fabrication process 100. Without an applied voltage to the electrode layers 204 (FIG. 2a), the LC 208 in the SPG cell 200 forms a grating that causes incident light on any of the glass substrates 206 to be diffracted to a direction determined by the angle of the two exposing beams (during the fabrication process 100) to form the alignment layers 202. When a non-zero voltage is applied to the electrode layers 204 (FIG. 2b), the LC 208 molecules become aligned with the electrical field caused by the applied voltage, and hence the LC grating effect (caused by the alignment layers 202) is cancelled out and incident light on any of the glass substrates 206 is no longer diffracted. To cancel the LC grating effect, a sufficiently high voltage may be needed, for example above a threshold voltage ($V_{th}$).

Figures 3A, 3B, 3C:
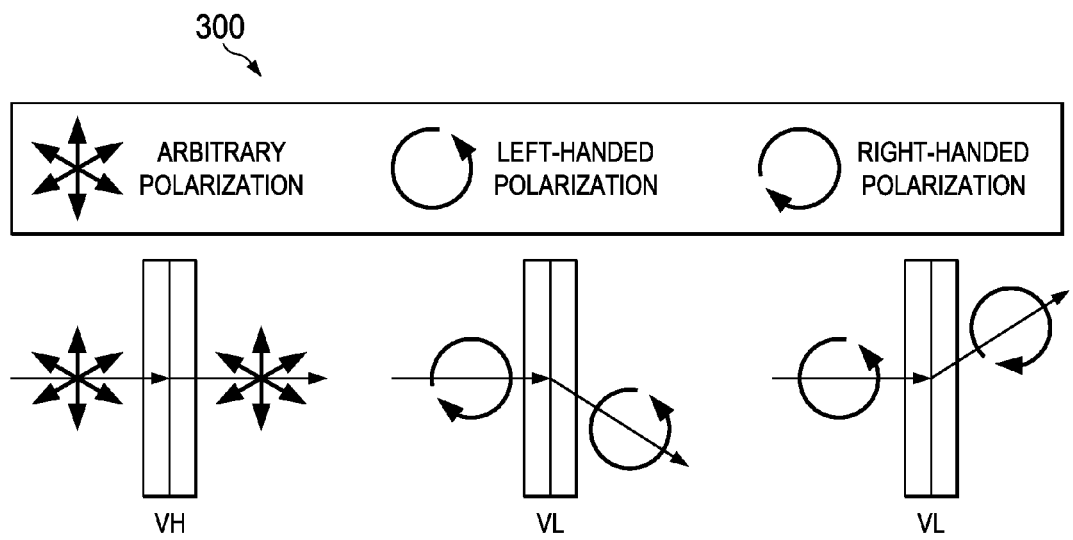
FIGS. 3a to 3c show different operation modes of a SPG cell.

The SPG cell above has three diffraction orders of 0 and ±1 that are different from general gratings. FIGS. 3a to 3c show different operation modes 300 of the SPG cell. Each operation mode corresponds to a diffraction order, and each order is diffracted into a different angle. With a sufficiently high voltage applied to the SPG cell (FIG. 3a), the light is diffracted into the $0^{th}$ order no matter what the incident light polarization is. When no or low voltage is applied (FIGS. 3b and 3c), the diffracted light direction is dependent on the incident light polarization. An incident light beam with right-handed circular polarization is diffracted to the $+1^{st}$ order (FIG. 3a), while incident light beam with left-handed circular polarization is diffracted to the $-1^{st}$ order (FIG. 3c). After being diffracted by the SPG cell, the light's handedness of polarization is changed (switched between right-handed and left-handed circular polarizations), as shown in FIGS. 3b and 3c.

FIGS. 4a to 4d show a fabrication process 400 of a PPG cell. A first step (FIG. 4a) of the fabrication process 400 of the PPG cell is to coat a photo-alignment layer 402 on a glass substrate 406. A second step (FIG. 4b) is to expose the polymer layer 402 with two interference UV beams (492) with opposite handedness of circular polarization. A third step (FIG. 4c) is to coat a polymerizable LC layer 403 on the top of the photo-alignment layer 402. A forth step (FIG. 4d) is to use a uniform UV beam 494 to illuminate the polymerizable LC layer 403 to polymerize the LC composition (molecules) of the layer. Thus, a polymer granting is formed on the glass substrate 406.

Figures 5A, 5B:
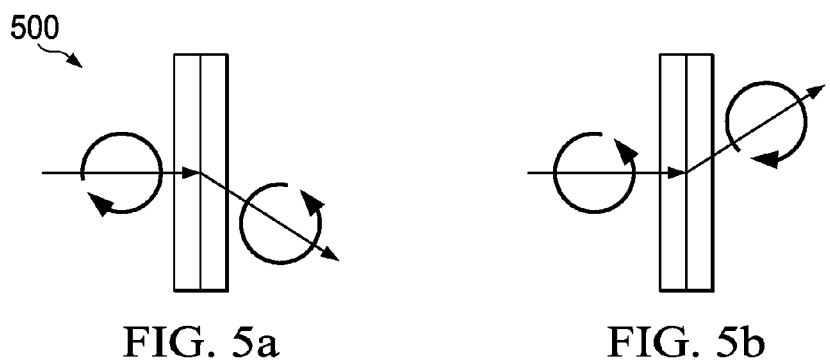
FIGS. 5a and 5b show different operation modes of a PPG cell.
Figure 4A:
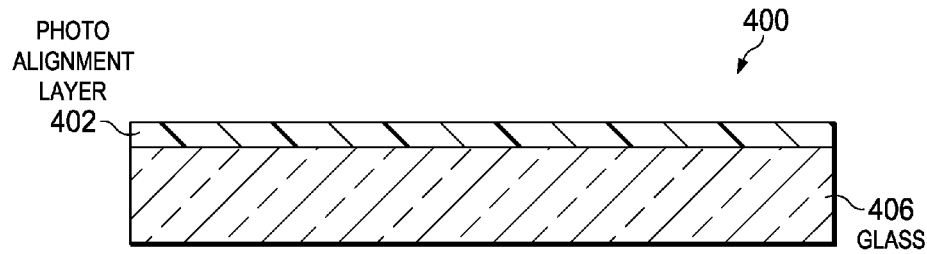
FIGS. 4a to 4d show a fabrication process of a polymer polarization grating (PPG) cell.
Figure 4B:
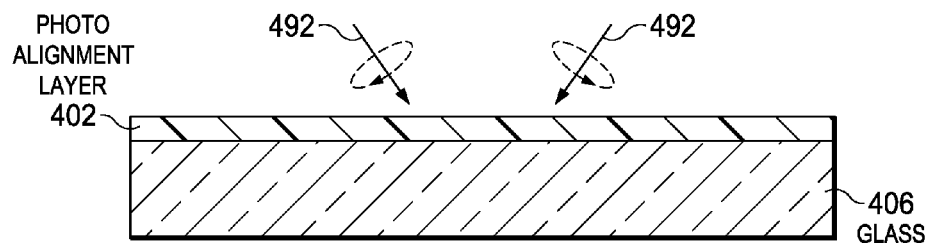
Figure 4C:
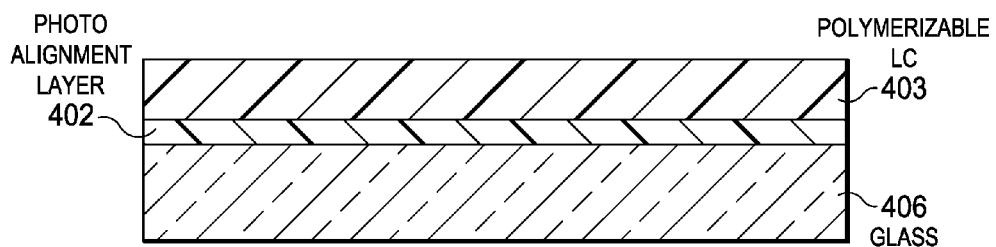
Figure 4D:
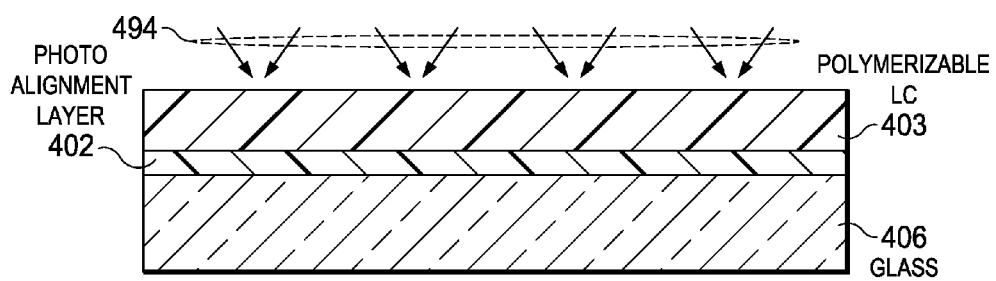

The resulting PPG cell is a fixed grating in that its diffraction characteristics cannot be changed through applying voltages (as in the case of the SPG cell above). FIGS. 5a and 5b show different operation modes 500 of the PPG cell. Each operation mode corresponds to a diffraction order, and each order is diffracted into a different angle. An incident light beam is diffracted into one of two directions. Specifically, incident light beam with right-handed circular polarization is diffracted to the $+1^{st}$ order (FIG. 5a), while incident light beam with left-handed circular polarization is diffracted to the $-1^{st}$ order (FIG. 5b). In either case after diffraction, the polarization handedness of the beam is changed or switched to the opposite handedness.

Figure 6:
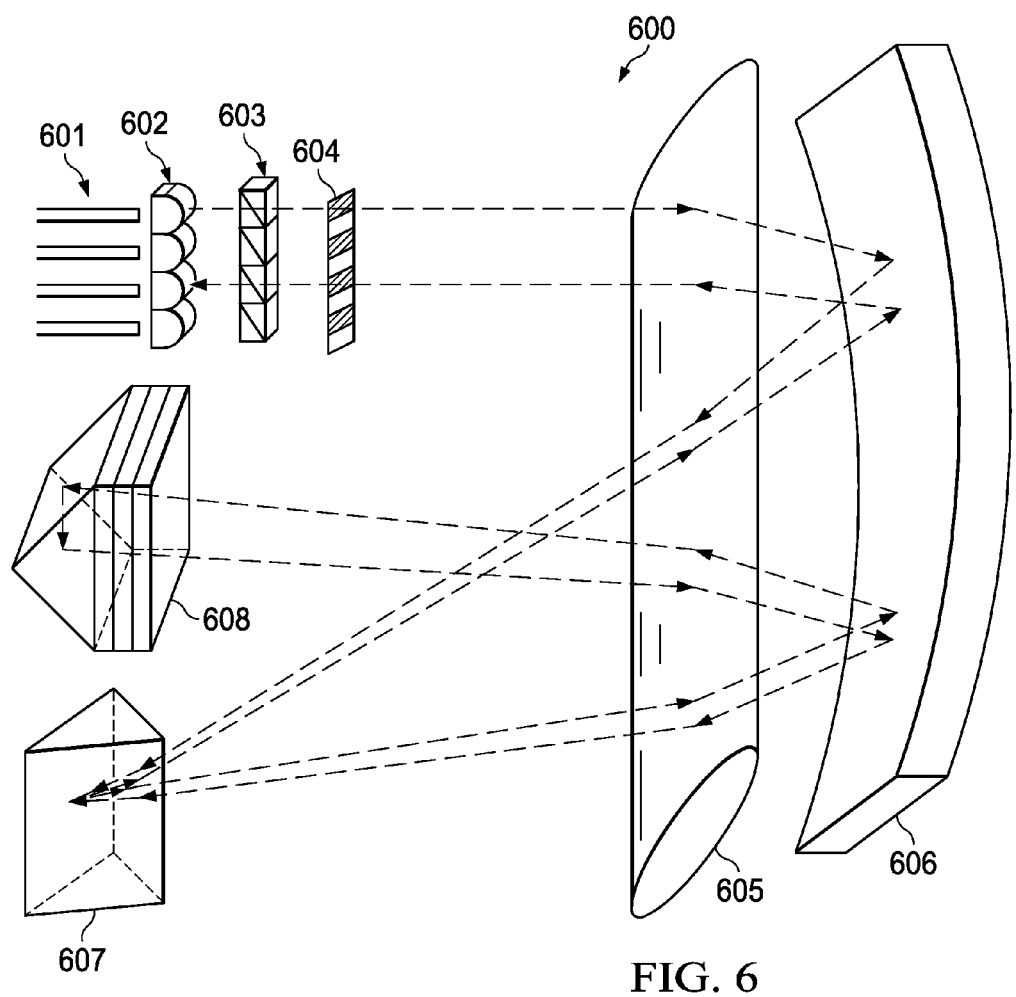
FIG. 6 shows an embodiment optical system for a wavelength selective switch (WSS)

FIG. 6 shows an embodiment optical system 600 for a WSS. The WSS optical system 600 includes a fiber array 601, a micro lens array 602, a beam displacer array 603, a half wave plate array 604, a cylindrical lens 605, a cylindrical reflection mirror 606, a grating 607, and an optical switch engine 608. The components of the WSS optical system 600 can be arranged as shown in FIG. 6 or in any other suitable arrangement that achieves the same or similar functionality. In other embodiments, additional components that may be similar or different than the components above may also be used. Some of the components above may also be replaced by combinations of same or other components that achieve the same functionality.

The fiber array 601 is used for input port and output ports. When an input or incident light beam from one fiber 601 passes through the micro lens array 602, the beam displacer array 603, and the half wave plate array 604, the beam is separated into two parallel beams with identical linear polarization state. The two light beams then become collimated beams after passing through the cylindrical lens 605 and the cylindrical reflection mirror 606. The light beams are then diffracted by the grating 607, resulting in separated wavelengths. Each wavelength is then focused on the optical switch engine 608. The switch engine 608 routes each wavelength to a defined port. The corresponding optical beams pass through the optical system 600 again (in a reverse order of components) and are coupled into defined output fibers.

The optical switch engine 608 of the WSS optical system 600 can be implemented using a suitable WSS system that includes combinations of SPG and LC cells or PPG and LC cells, as described below. In comparison to other used WSS technologies (e.g., MEMS, LCOS, LC and wedge plate, DMD), the WSS system using SPGs or PPGs has advantages of simple optical system, simple electronic driving circuit, high reliability, high performance, easily achieved high port count, and low product cost.

FIGS. 7a to 7h show different operation modes 700 of a combination of LC and SPG cells. A LC cell 710 is positioned before a SPG cell 720 (with respect to incident light). The LC cell 710 is used to control or switch the light polarization and the SPG cell 720 is used to diffract the light beam to a defined direction.

Figure 7A:
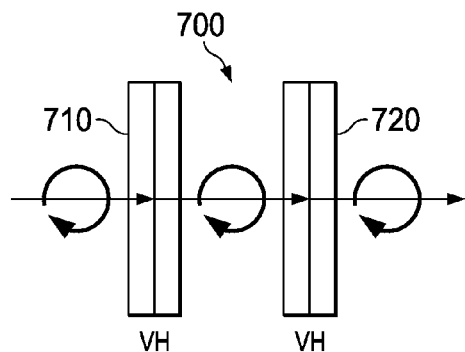
FIGS. 7a to 7h show different operation modes of a combination of liquid crystal (LC) and SPG cells.
Figure 7B:
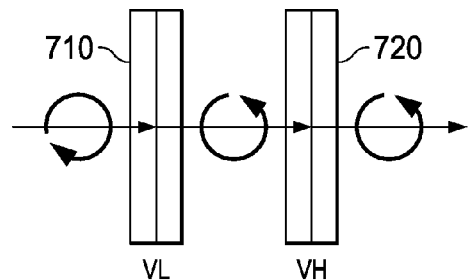
Figure 7C:
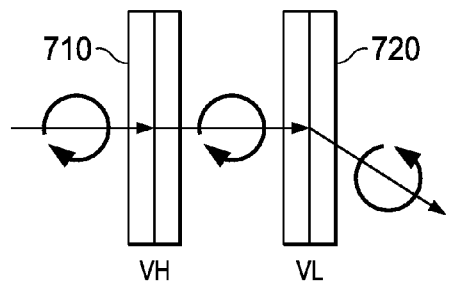
Figure 7D:
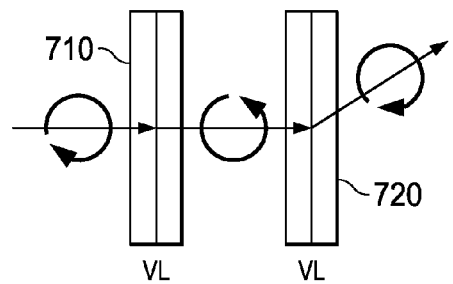
Figure 7E:
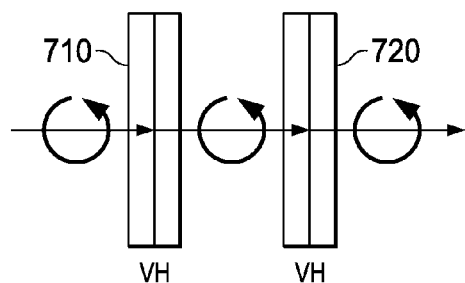
Figure 7F:
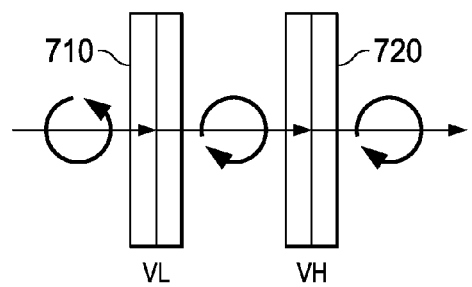
Figure 7G:
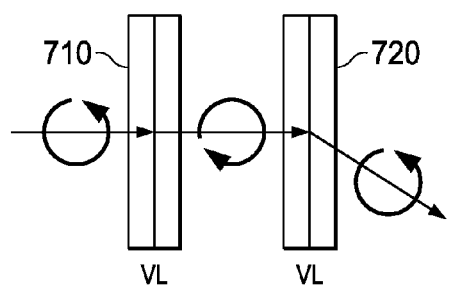
Figure 7H:
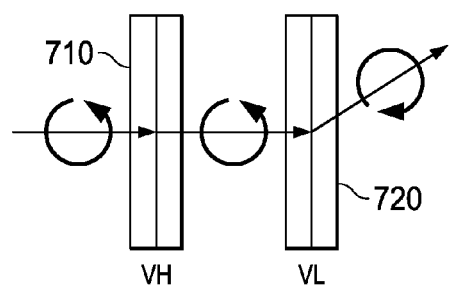

As shown in FIGS. 7a, 7c, 7e, and 7h, when a relatively high voltage (VH) (e.g., above a threshold) is applied on the LC cell 710, the incident light beam polarization is not changed through the LC cell. As shown in FIGS. 7b, 7d, 7f, and 7g, without applied voltage or with a relatively low voltage (VL) (e.g., below a threshold) on the LC cell 710, the incident light beam polarization is switched between right-handed and left-handed polarization. As shown in FIGS. 7a, 7b, 7e, and 7f, when a relatively VH (e.g., above a threshold) is applied on the SPG cell 720, the light beam is diffracted to the $0^{th}$ order, no matter what is the polarization of the input light. As shown in FIGS. 7c, 7d, 7g, and h, without applied voltage or with a relatively VL (e.g., below a threshold) on the SPG cell 720, the light beam can be diffracted to either the $+1^{st}$ order or the $-1^{st}$ order, depending on the incident light's polarization that is controlled by the LC cell 710. Regardless whether the input light has right-handed or left-handed circular polarization, the combination of the LC cell 710 and the SPG cell 720 can route the light beam to three directions, resulting in a 1×3 optical switch. N groups of LC and SPG cells can realize a $1\times3^N$ optical switch.

Figure 8:
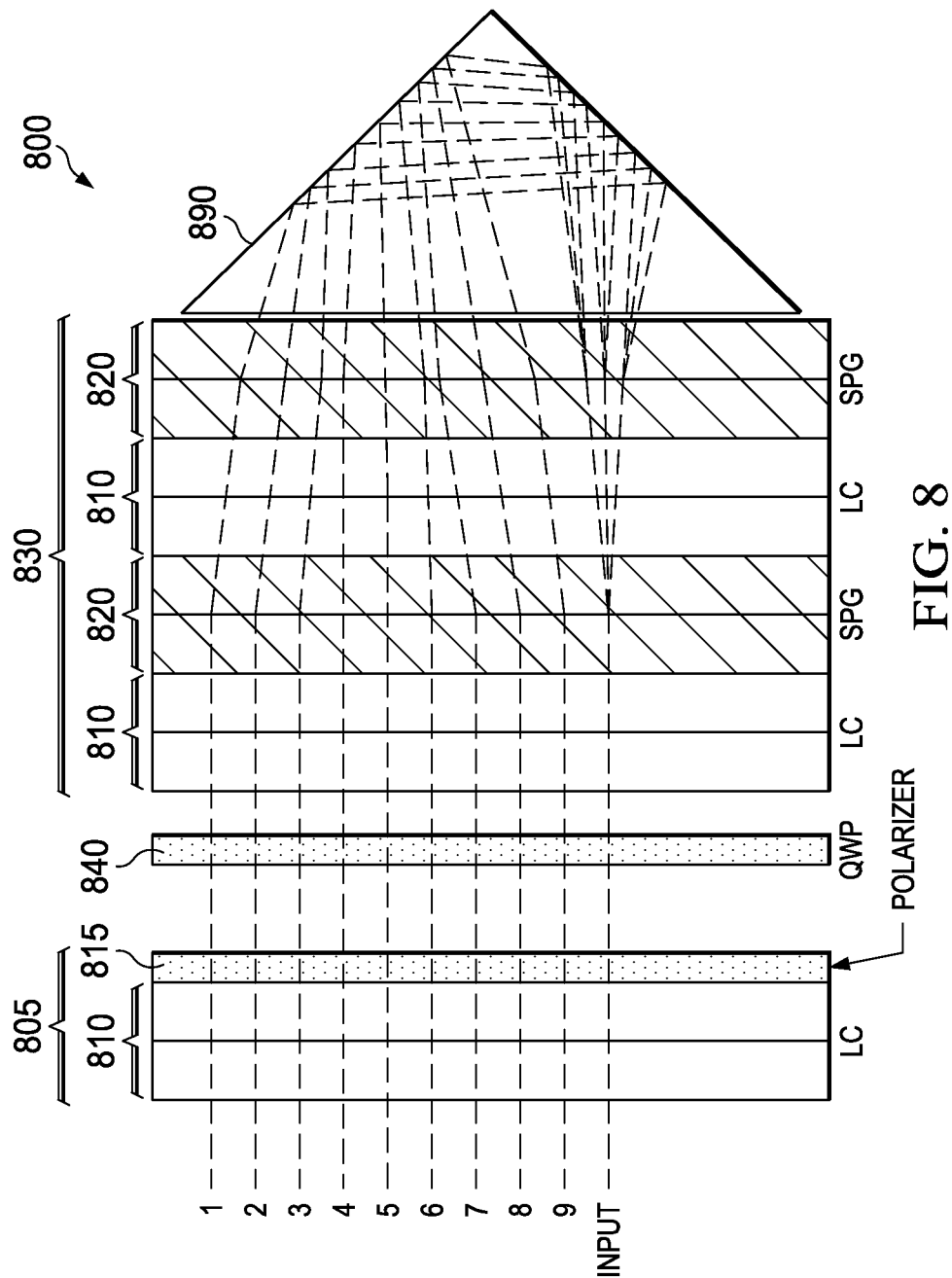
FIG. 8 shows an embodiment optical switch engine using combinations of LC and SPG cells.

FIG. 8 shows a cross section of an embodiment optical switch engine 800 using combinations of LC and SPG cells. The optical switch engine 800 can be used as the optical switch engine 608 in the WSS optical system 600. The optical switch engine 800 comprises a variable optical attenuator (VOA) 805 including a LC cell 810 coupled to a polarizer 815, a quarter wave plate (QWP) 840, a 1×9 optical switch 830 including two consecutive pairs of LC 810 and SPG 820 cells, and a prism or mirror 890. The components can be arranged as shown in FIG. 8 or in another suitable order. The LC cells 810 and SPG cells 820 can have M pixels in the perpendicular direction to the N=9 beams (perpendicular to the surface of FIG. 8). In FIG. 8, N is the number of beams corresponding to ports and M is the number of pixels corresponding to wavelength channels. LC cells used in the optical engine 800 can be electrically controlled birefringence (ECB), twisted nematic (TN), and vertically aligned (VA) cells.

For simplicity, the switch engine's working principle is described for one wavelength, as shown by the cross section of the engine 800 in FIG. 8. However, the same working principle applies to all M pixels.

The input light first passes through the VOA 805 that is used to control the light power attenuation. Controlling the voltage on the LC cell 810 can control the output optical power of the VOA 805. The QWP 840 is used to change the linear polarization of the light into a circular polarization. The light beam then passes through two groups of LC 810 and SPG 820 cells (the 1×9 optical switch 830). Thus, the output beam has 9 possible angles with the optical axis. The beam is then reflected by the prism or mirror 890 and becomes parallel to the optical axis after passing through the switch 830. The optical switch engine 800 can be designed properly to achieve about equal distance between any two adjacent light paths (of the 9 possible switching angles). As such, a standard fiber array can be used as the optical output ports (e.g., with 9 output ports).

Figure 9:
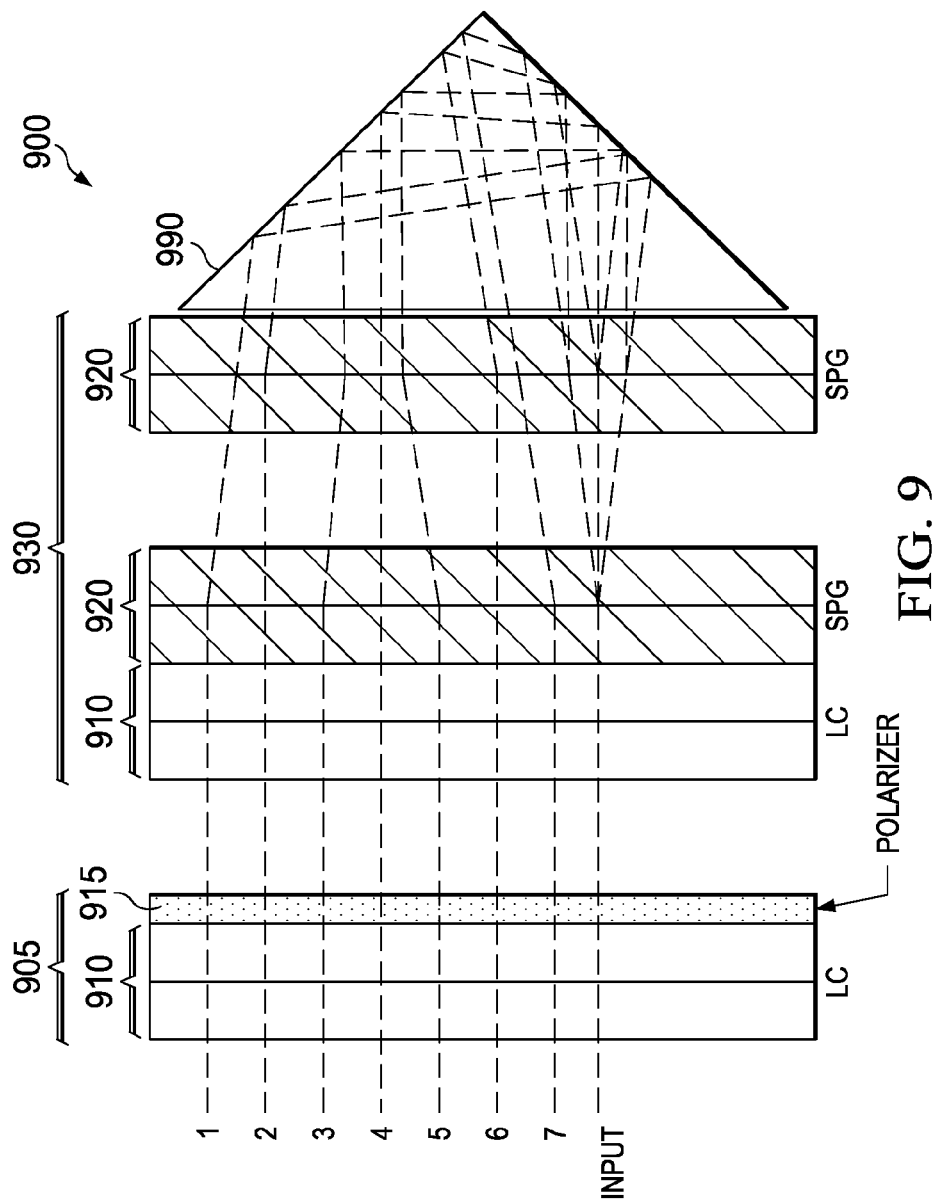
FIG. 9 shows another embodiment optical switch engine using combinations of LC and SPG cells.

FIG. 9 shows a cross section of another embodiment optical switch engine 900 using combinations of LC and SPG cells. The optical switch engine 900 can be used as the optical switch engine 608 in the WSS optical system 600. The optical switch engine 900 comprises a VOA 905 including a LC cell 910 coupled and a polarizer 915, a 1×7 optical switch 930 including a pair of LC 910 and SPG 920 cells followed by a second SPG cell 920, and a prism or mirror 990. The components can be arranged as shown in FIG. 9 or in another suitable order. The LC cells 910 and SPG cells 920 may also have M pixels in the perpendicular direction to the N=7 beams (perpendicular to the surface of FIG. 9). One difference between the optical switch engine 900 and the optical switch engine 800 is that the optical switch engine 900 uses one LC cell 910 and two SPG cells 920 to achieve a 1×7 optical switch. In the 1×7 optical switch, the LC cell 910 is used to control the light polarization and the two SPG cell 920 are used to diffract light to the defined angles. Additionally, the optical switch engine 900 does not include a QWP. Instead, the LC cell 910 in the VOA 905 is designed as a switchable quarter wave plate (switching between $\lambda/4$ and $3\lambda/4$) to change the linear polarization of the incident light into a circular polarization. To increase optical output ports, more SPG cells 920 can be added to the optical switch engine 900, e.g., in front of the mirror or prism 990. For example, with N SPG cells 920, a $1\times(2^{N+1}-1)$ optical switch engine can be implemented.

Figure 10:
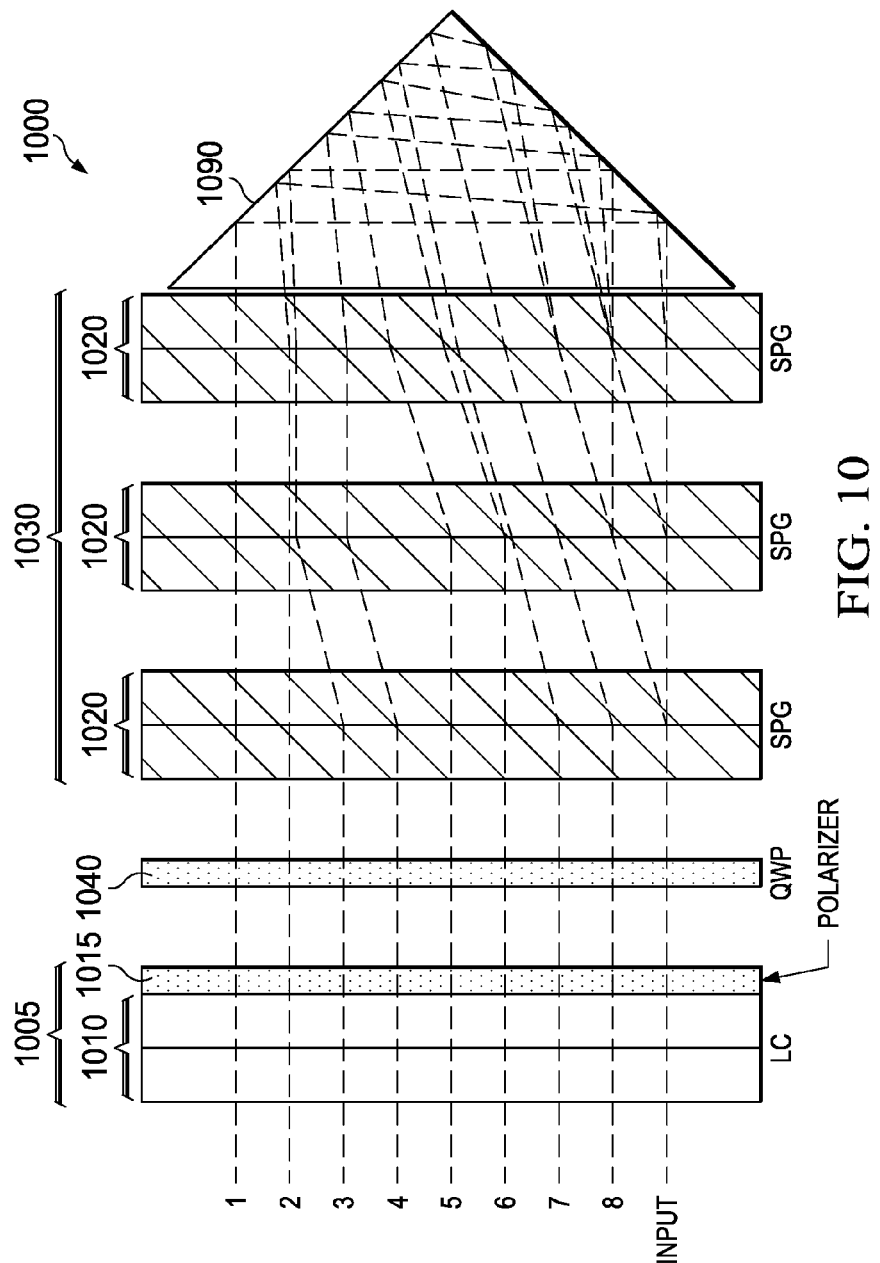
FIG. 10 shows yet another embodiment optical switch engine using combinations of LC and SPG cells.

FIG. 10 shows a cross section of yet another embodiment optical switch engine 1000 using combinations of LC and SPG cells. The optical switch engine 1000 can be used as the optical switch engine 608 in the WSS optical system 600. The optical switch engine 1000 comprises a VOA 1005 including a LC cell 1010 coupled to a polarizer 1015, a QWP 1040, a 1×8 optical switch 1030 including three SPG cells 1020, and a prism or mirror 1090. The components can be arranged as shown in FIG. 10 or in another suitable order. The SPG cells 1020 may also have M pixels in the perpendicular direction to the N=8 beams (perpendicular to the surface of FIG. 10). Unlike the optical switch engines 800 and 900 above, the optical switch engine 1000 only uses SPG cells 1020 to control the light diffraction angles without a LC cell. After a light beam passes through the VOA 1005 and the QWP 1040, the linear polarization of the incoming beam is changed to the circular polarization. Each SPG cell 1020 can diffract the light beam to two possible angles. Therefore, with N SPG cells, a $1\times 2^N$ optical switch engine can be formed.

FIGS. 11a to 11d show different operation modes 1100 of a combination of LC and PPG cells. A LC cell 1110 is positioned before a SPG cell 1150 (with respect to incident light). The LC cell 1110 is used to control or switch the light polarization and the PPG cell 1150 is used to diffract the light beam to one of two possible directions depending on the incoming light's polarization. Therefore, N groups of LC and PPG cells can compose a $1\times 2^N$ optical switch.

Figure 11A:
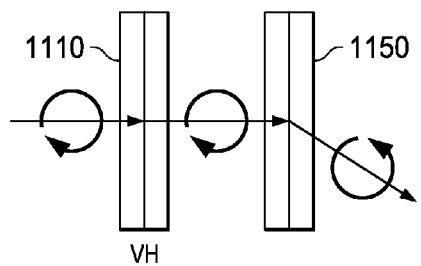
FIGS. 11a to 11d show different operation modes of a combination of LC and PPG cells.
Figure 11B:
Figure 11B:
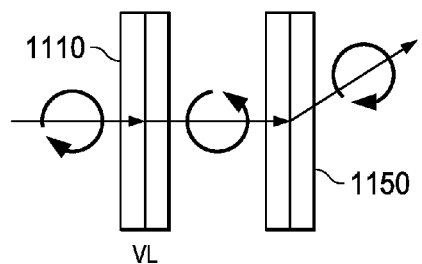
Figure 11C:
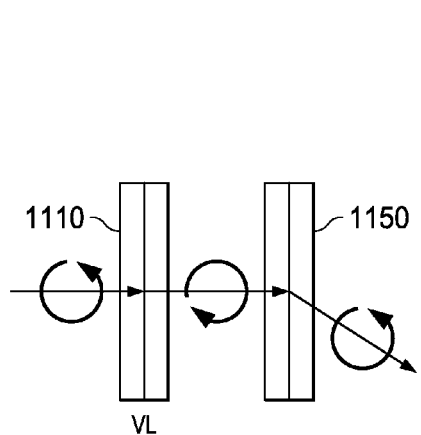
Figure 11D:
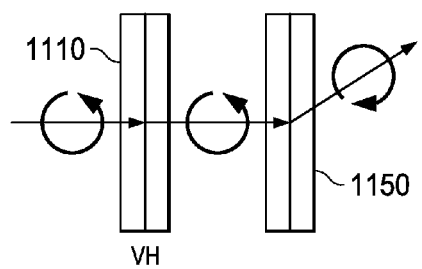

As shown in FIGS. 11a and 11d, when a VH (e.g., above a threshold) is applied on the LC cell 1110, the incident light beam polarization is not changed through the LC cell. As shown in FIGS. 11b and 11c, without applied voltage or with a VL (e.g., below a threshold) on the LC cell 1110, the incident light beam polarization is switched between right-handed and left-handed polarization. As shown in FIGS. 11a and 11c, when the incident light on the PPG cell 1150 has a right-handed circular polarization, the light beam is diffracted to the $+1^{st}$ order. As shown in FIGS. 11b and 11d, when the incident light on the PPG cell 1150 has a left-handed circular polarization, the light beam is diffracted to the $-1^{st}$ order.

Figure 12:
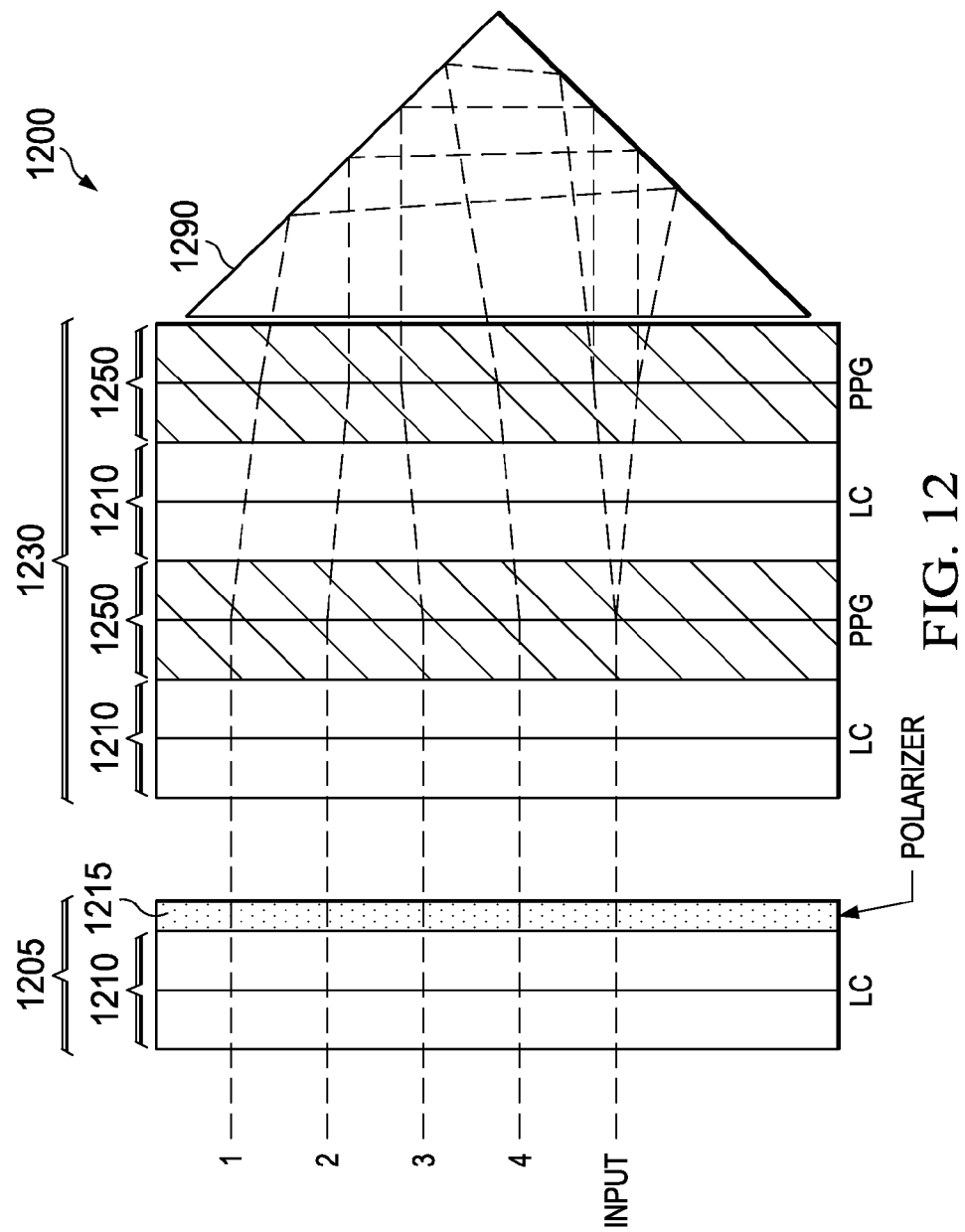
FIG. 12 shows an embodiment optical switch engine using combinations of LC and PPG cells.

FIG. 12 shows a cross section of an embodiment optical switch engine 1200 using combinations of LC and PPG cells. The optical switch engine 1200 can be used as the optical switch engine 608 in the WSS optical system 600. The optical switch engine 1200 comprises a VOA 1205 including a LC cell 1210 coupled to a polarizer 1215, a 1×4 optical switch 1230 including two consecutive pairs of LC 1210 and PPG 1250 cells, and a prism or mirror 1290. The components can be arranged as shown in FIG. 12 or in another suitable order. The LC cells 1210 and PPG cells 1250 can have M pixels in the perpendicular direction to the N=4 beams (perpendicular to the surface of FIG. 12). Similar optical switches can be designed to have any number of output ports by stacking together a required number of LC and PPG pairs.

Figure 13:
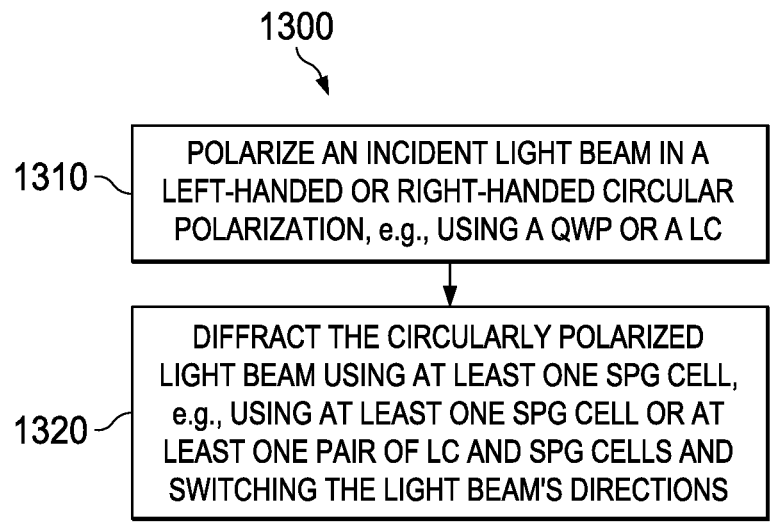
FIG. 13 shows an embodiment method for operating an optical switch engine using LC and SPG cells.

FIG. 13 shows an embodiment method 1300 for operating an optical switch engine using LC and SPG cells. For example, the method 1300 is implemented using any of the optical switch engines 800, 900, and 1000. At step 1310, an incident light beam is polarized in a left-handed or right-handed circular polarization. For example, the linearly polarized incident light beam is converted into a circularly polarized light using the QWP 840 or 1040 or the electrically switchable (by applied voltage) LC. At step 1320, the circularly polarized light beam is diffracted using at least one SPG cell. The diffracted light beam's handedness is also switched. For example, the circularly polarized light is switched between left-handed and right-handed direction using a first electrically switchable LC 810 in the 1×9 optical switch 830 (or LC 910 in the 1×7 optical switch 930) and subsequently diffracted in a corresponding angle by a next electrically switchable SPG 820 (or 920). In another example, the circularly polarized light is directly diffracted in a corresponding angle by a first electrically switchable SPG 1020 in the 1×8 optical switch 1030.

Figure 14:
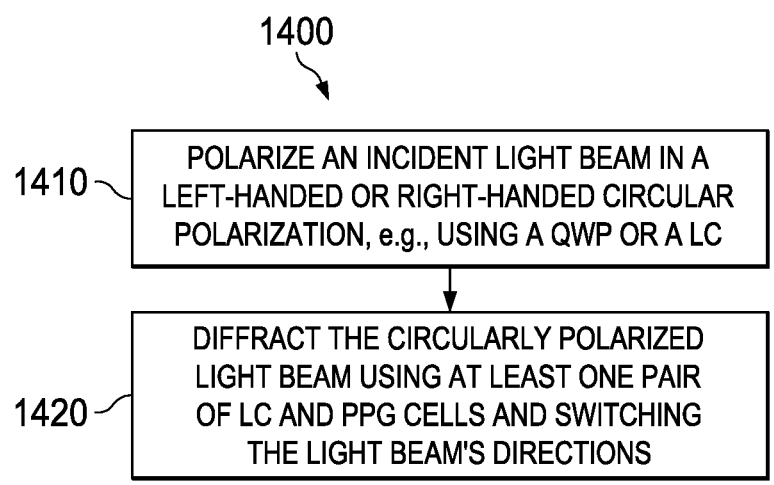
FIG. 14 shows an embodiment method for operating an optical switch engine using LC and PPG cells.

FIG. 14 shows an embodiment method 1400 for operating an optical switch engine using LC and PPG cells. For example, the method 1400 is implemented using the optical switch engine 1200. At step 1410, an incident light beam is polarized in a left-handed or right-handed circular polarization. For example, the linearly polarized incident light beam is converted into a circularly polarized light using the electrically switchable LC. At step 1420, the circularly polarized light beam is diffracted using at least one pair of LC and PPG cells. The diffracted light beam's handedness is also switched. For example, the circularly polarized light is switched between left-handed and right-handed direction using a first electrically switchable LC 1210 in the 1×4 optical switch 1230 and subsequently diffracted in a corresponding angle by a next electrically switchable SPG 1250.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. An optical switch comprising:
 a liquid crystal cell; and
 a polymer polarization grating (PPG) cell adjacent to the liquid crystal cell, the PPG comprising:
 a glass substrate;
 a photo-alignment layer overlying the glass substrate; and
 a polymerized liquid crystal layer overlying the photo-alignment layer on an opposite side of the glass substrate, wherein the photo-alignment layer comprises photosensitive polymer that has been physically altered by exposure using two interfering light beams with opposite handedness of circular polarization.
2. The optical switch of claim 1, wherein the polymerized liquid crystal layer has been physically altered by illumination using a uniform light beam.

3. The optical switch of claim 1, further comprising:
a variable optical attenuator (VOA) comprising a second liquid crystal cell and a polarizer;
a prism or mirror positioned next to the PPG cell on an opposite side of the liquid crystal cell; and
one or more pairs of an additional liquid crystal cell and an additional corresponding PPG cell positioned between the PPG cell and the prism or mirror.

4. The optical switch of claim 3, wherein the optical switch is a $1 \times 2^N$ optical switch configured to optically connect one common port to $2^N$ separate ports, where N is a number of pairs of liquid crystal cells and corresponding PPG cells in the optical switch.

5. The optical switch of claim 1, wherein both the liquid crystal cell and the PPG cell comprise a plurality of pixels corresponding to wavelength channels and aligned perpendicular to a direction of a plurality of parallel light beam paths through the optical switch corresponding to optical switch ports.

6. The optical switch of claim 5, wherein the optical switch is designed to have equal distance between parallel output light beams from the optical switch.

7. The optical switch of claim 1, further comprising:
a fiber array that transmits and receives one or more incident light beams to and from the liquid crystal cell and the PPG cell;
a micro lens array positioned on the optical path next to the fiber array;
a beam displacer positioned on the optical path next to the micro lens array;
a half wave plate array positioned on the optical path next to the beam displacer;
a cylindrical lens positioned on the optical path between the half wave plate array and the liquid crystal cell with the PPG cell;
a cylindrical reflection mirror facing the liquid crystal cell and the PPG cell behind the cylindrical lens on the optical path and positioned to reflect a light beam that is passed through the cylindrical lens back through the cylindrical lens; and
a grating facing the cylindrical reflection mirror behind the cylindrical lens on the optical path and positioned to diffract a light beam that is passed through the cylindrical lens back onto the cylindrical lens.

8. The optical switch of claim 1, wherein the liquid crystal cell is configured to, with no applied voltage or a first applied voltage across the liquid crystal cell, pass an incident light beam that has a circular polarization to the PPG cell after reversing the circular polarization's handedness.

9. The optical switch of claim 8, wherein the liquid crystal cell is configured to, with a second applied voltage across the liquid crystal cell, pass the incident light beam without changing the circular polarization's handedness.

\* \* \* \* \*